(12) United States Patent
Pais et al.

(10) Patent No.: US 8,724,314 B2
(45) Date of Patent: May 13, 2014

(54) APPARATUS FOR SUPPLEMENTAL COOLING OF A DOCKED MOBILE COMPUTING DEVICE

(75) Inventors: Martin R. Pais, North Barrington, IL (US); Thomas A. Petrella, Walworth, WI (US)

(73) Assignee: Motorola Mobility LLC, Chicago, IL (US)

( * ) Notice: Subject to any disclaimer, the term of this patent is extended or adjusted under 35 U.S.C. 154(b) by 172 days.

(21) Appl. No.: 13/167,750

(22) Filed: Jun. 24, 2011

(65) Prior Publication Data

US 2012/0327581 A1     Dec. 27, 2012

(51) Int. Cl.
*H05K 7/20*     (2006.01)

(52) U.S. Cl.
USPC ............ 361/679.46; 361/679.48; 361/679.55; 361/679.56; 361/689; 361/690; 174/16.1; 165/80.3

(58) Field of Classification Search
None
See application file for complete search history.

(56) References Cited

U.S. PATENT DOCUMENTS

| | | | | |
|---|---|---|---|---|
| 6,256,193 | B1 * | 7/2001 | Janik et al. | 361/679.59 |
| 6,453,378 | B1 * | 9/2002 | Olson et al. | 710/304 |
| 6,532,151 | B2 * | 3/2003 | Osecky et al. | 361/679.48 |
| 6,665,163 | B2 * | 12/2003 | Yanagisawa | 361/103 |
| 6,826,047 | B1 * | 11/2004 | Chen et al. | 361/679.47 |
| 7,684,185 | B2 * | 3/2010 | Farrugia | 361/679.41 |
| 7,830,661 | B2 * | 11/2010 | Sween et al. | 361/695 |
| 8,199,507 | B2 * | 6/2012 | Shohet et al. | 361/710 |
| 2002/0181201 | A1 * | 12/2002 | Liu et al. | 361/687 |
| 2003/0154291 | A1 | 8/2003 | Ocheltree et al. | |
| 2004/0201959 | A1 | 10/2004 | Pokharna et al. | |
| 2006/0262497 | A1 * | 11/2006 | Jahlokov | 361/683 |
| 2007/0263348 | A1 * | 11/2007 | Rutledge et al. | 361/681 |
| 2008/0037213 | A1 * | 2/2008 | Haren | 361/687 |
| 2008/0062625 | A1 * | 3/2008 | Batio | 361/680 |
| 2010/0008036 | A1 | 1/2010 | Risher-Kelly | |
| 2011/0292584 | A1 * | 12/2011 | Hung et al. | 361/679.26 |
| 2012/0236501 | A1 * | 9/2012 | Nagasawa | 361/701 |

FOREIGN PATENT DOCUMENTS

WO     2004064119 A2     1/2004

\* cited by examiner

*Primary Examiner* — Boris Chervinsky

(57) ABSTRACT

An apparatus for supplemental cooling of a docked mobile device that includes a docking module having a docking interface that provides a communication connection for a separable mobile device having several heat generating electronic components that emanate heat when the separable mobile device is in an operating mode. In addition, the separable mobile device has an integrated heat sink structure that spreads the heat emanating from the operating heat generating electronic components across the entire heat sink structure. An air mover is integrated into the docking module to provide a volume of air flow that is directed to the separable mobile device while it is docked to the docking module. Accordingly, an air mover controller receives a first signal from an input sensor and therein controls the air mover to modulate the volume of air flow according to a predetermined tolerance corresponding to the heat generating electronic components.

13 Claims, 9 Drawing Sheets form part of the specification, and serve to further illustrate embodiments of concepts that include the claimed invention, and explain various principles and advantages of those embodiments.

APPARATUS FOR SUPPLEMENTAL COOLING OF A DOCKED MOBILE COMPUTING DEVICE

FIELD OF THE DISCLOSURE

The present disclosure relates generally to mobile communication devices or mobile computing devices and more particularly to smartphones and tablets that are docked to accessory devices.

BACKGROUND

Current smartphone and other mobile computing devices (MCD), such as tablets, and gaming devices include internal electronics and architectures that enable the MCD to perform multiple data intensive functions. For example, connecting to cellular and wireless networks, connecting to global positioning systems GPS), and displaying cinema-like video. One of the by-products of these data intensive functions is the generation of heat in the internal electronic components. Nevertheless, the MCD has generally been designed to dissipate this internal heat by relying on its physical architecture such that the MCD's material structure collects and spreads the heat and then dissipates it to the ambient external air. This method of cooling is considered as "passive."

One physical drawback of a smartphone can be its small display screen. As such, some smartphone manufacturers have offered an accessory for docking with the smartphone. The accessory provides an enhanced user interface via a larger and higher resolution display, a larger input area (via a physical keyboard, or touchscreen, or mouse/touchpad), and perhaps a larger battery or power supply. Consequently, these additional features have been compared to a conventional laptop computer, therefore, the accessory has been termed "lapdock" in that it may comprise a display and keypad, but no processing capability, because the processing function resides in the smartphone. Nevertheless, once the smartphone and the lapdock are mated or docked together the passive cooling method of the smartphone can be severely deficient and at least inefficient, due to possible additional loading imposed by one or more lapdock-based applications.

Accordingly, there is a need for an apparatus that employs supplemental cooling of a docked mobile device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
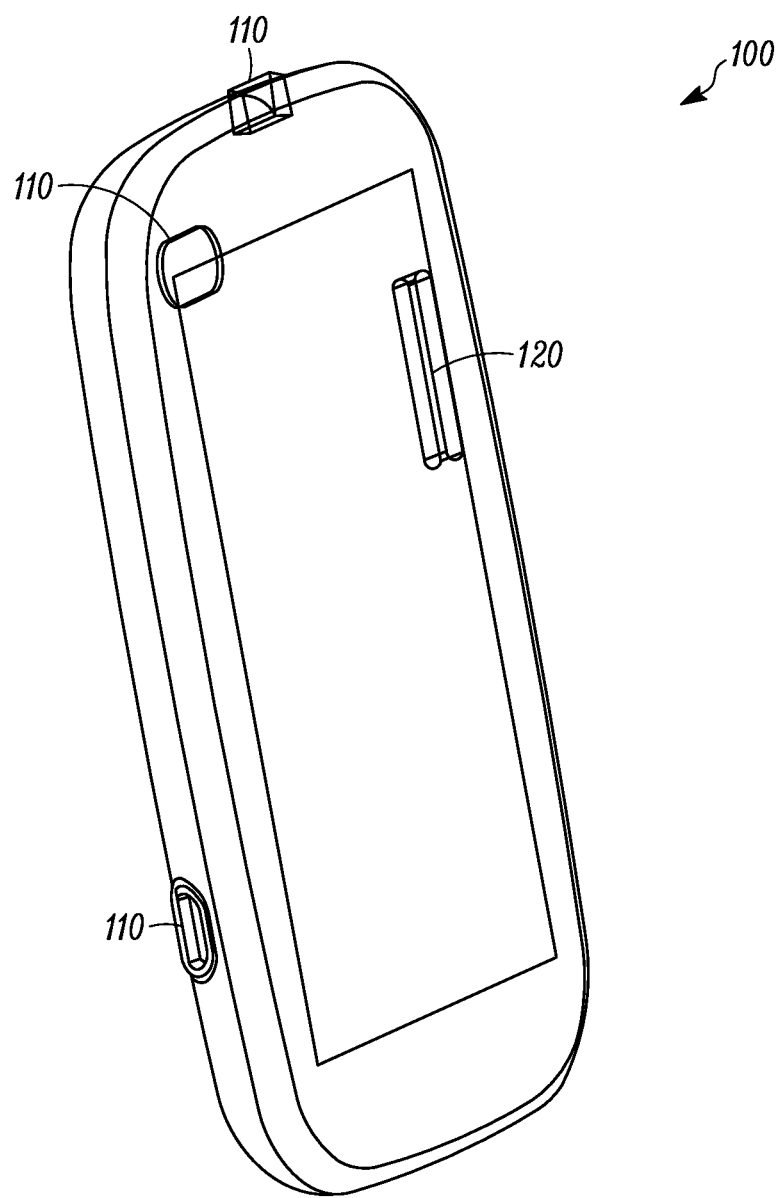
FIG. 1 is an exemplary illustration of a mobile computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Described herein is an apparatus for cooling a docked mobile device that includes a docking module having a docking interface that provides a communication connection for a separable mobile device. This separable mobile device can include several heat generating electronic components that emanate heat when the separable mobile device is in an operating mode. In addition, the separable mobile device has an integrated heat sink structure that spreads the heat emanating from the operating heat generating electronic components across the entire heat sink structure. An air mover is integrated into the docking module to provide a volume of air flow that is directed to the separable mobile device while it is docked to the docking module. Accordingly, an air mover controller receives a first signal from a temperature sensor and therein controls the air mover to modulate the volume of air flow according to a predetermined temperature tolerance of the heat generating electronic components.

FIG. 1 is an exemplary illustration of a mobile computing device 100 that includes jacks or interconnections for external module connections. These external modules can include communication components. FIG. 1 shows mobile computing device 100 in a stand-alone or separable configuration. The mobile computing device (MCD) includes features 110. A Bluetooth antenna module 120 integrated into mobile computing device 100 can be utilized for wireless communication access.

Figure 2:
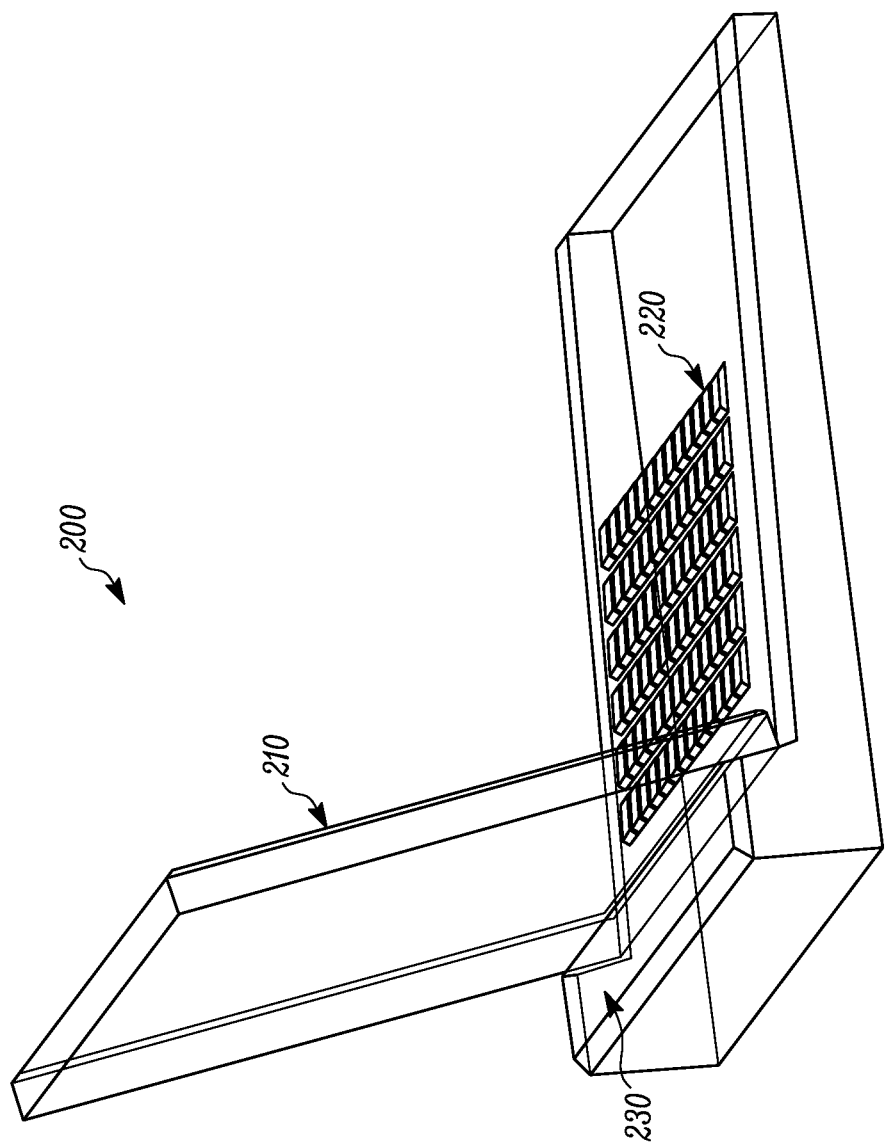
FIG. 2 is an exemplary illustration of a lapdock accessory.

FIG. 2 is an exemplary illustration of an accessory for the mobile computing device 100 shown in FIG. 1. The accessory is commonly referred to as a lapdock due to its resemblance to a laptop computer in that the lapdock 200 includes a display region 210 and a keypad 220 for interfacing with applications that run on the mobile computing device 100 when the mobile computing device 100 is docked or electronically interconnected with the lapdock 200. A docking region 230 allows for physical and electronic interconnection between the lapdock 200 and the mobile computing device 100.

Figure 3:
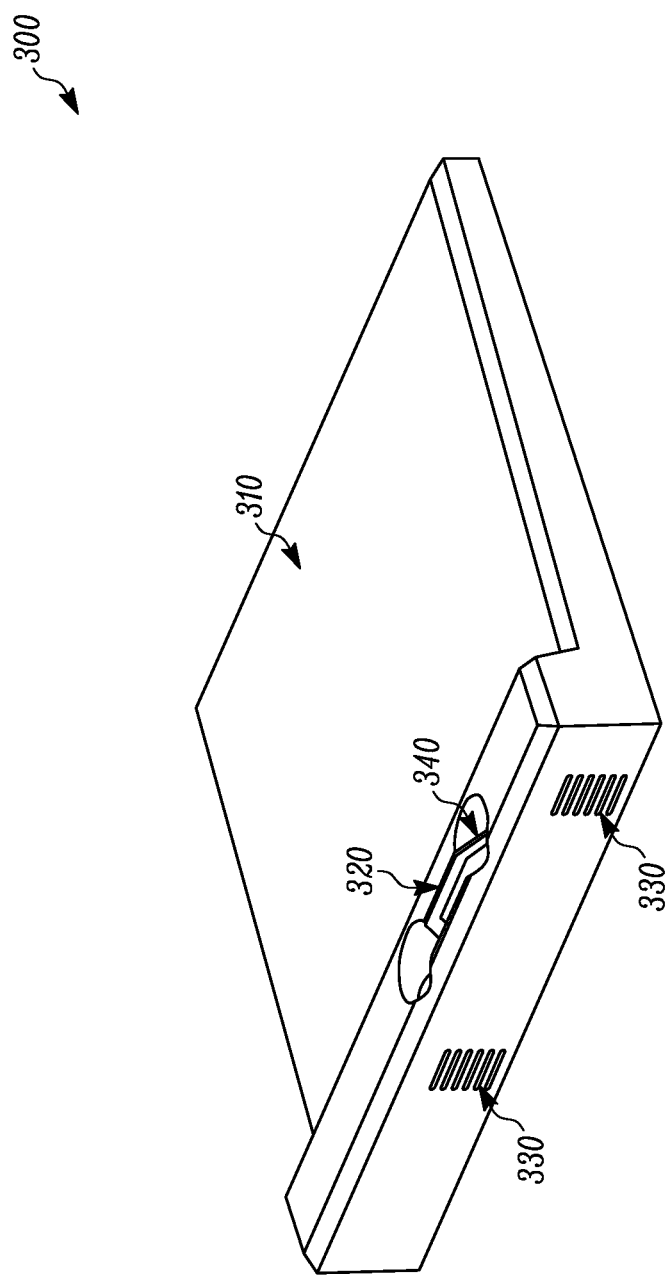
FIG. 3 is an exemplary illustration of the lapdock accessory shown in FIG. 2.

FIG. 3 is an exemplary illustration of the docking module 300 of the lapdock 200 shown in FIG. 2. Docking module 300 includes a surface 310 that can be a touchscreen and a connecting port 320 that is configured to interconnect physically and electronically with a mobile computing device 100 as shown in FIG. 1. Noteworthy are the air inlets 330 for drawing in external ambient air to docking module 300. Air movers within dock region 340 recirculate the air entering air inlets 330 and provide a volume of air flow in the dock region 340. This volume of air flow is directed to the mobile computing device 100 while it is docked to the docking module. Current lapdocks are designed to be "FLIP"-like. It is envisioned that a tablet form-factor could also suffice where the tablet could double as a touchscreen or display+keypad.

Figure 4:
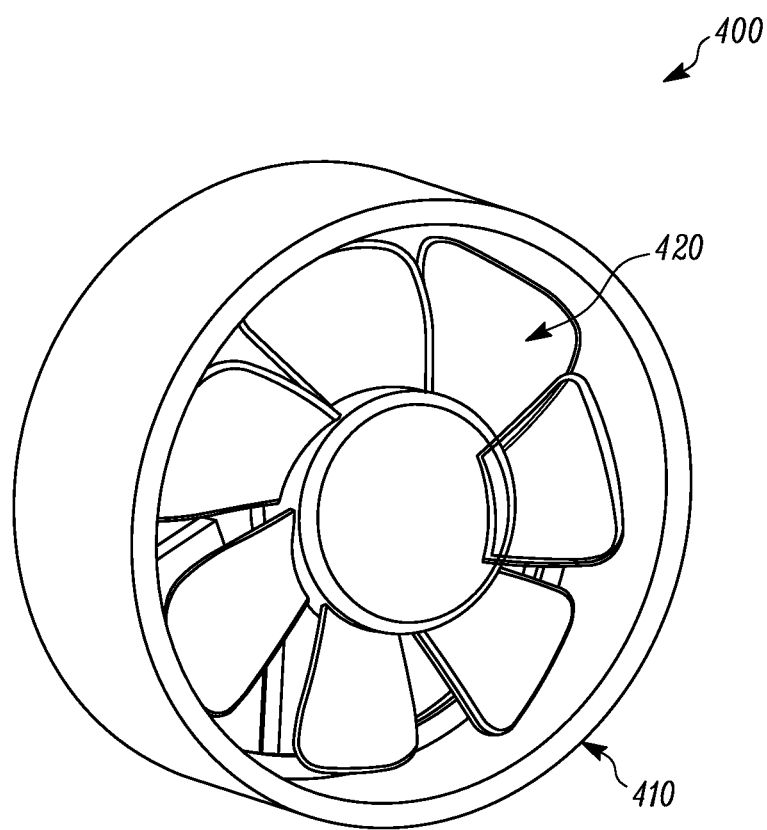
FIG. 4 is an exemplary illustration of an air mover employed inside the lapdock accessory.

FIG. 4 is an exemplary illustration of an air mover 400 employed inside the docking module 300 shown in FIG. 3. Air mover 400 includes a housing 410 and several rotatable blades within housing 420. In this example, air mover 400 is a fan, however, air mover 400 may also be a vane-axial fan, a radial blower, a piezo-driven fan, or any physical means of pumping air. The docking region is configured so as to direct or channel the air emanating from the air mover to flow over the MCD.

Air mover 400 is located within dock region 340 as shown in FIG. 3 and is controlled by an air mover controller (shown in FIG. 5) that modulates the volume of air produced by air mover 400. The air mover controller can be located within the mobile computing device 100 or within lapdock 200.

Figure 5:
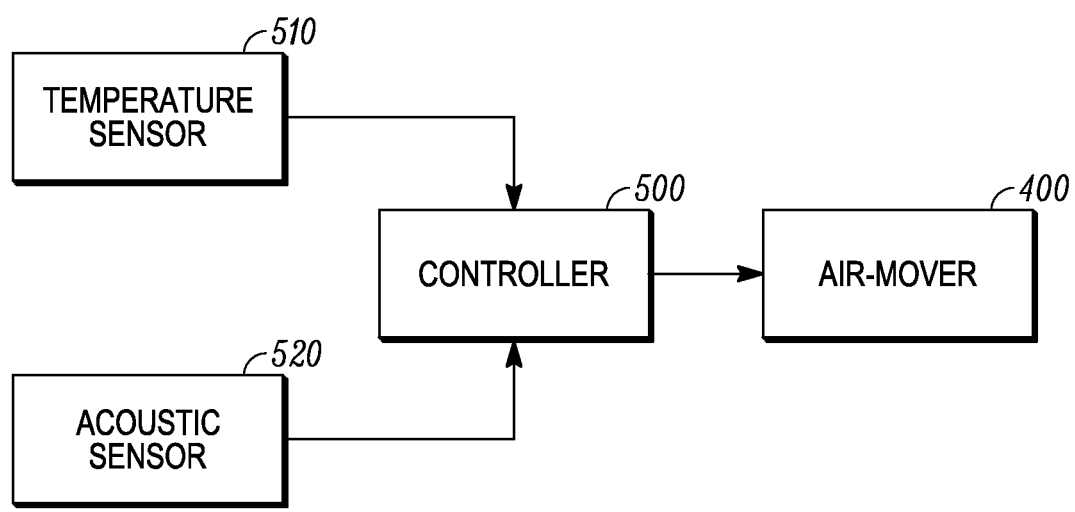
FIG. 5 is a simplified exemplary block diagram of an air mover controller and its inputs.

FIG. 5 illustrates a simplified example of air mover controller 500 receiving input signals from a temperature sensor 510 and an acoustic sensor 520 for modulating the volume of air produced by air mover 400. Air mover controller 500 can receive either both sensor signals or individual signals from temperature sensor 510 and acoustic sensor 520. Either sensor may reside or be located within mobile computing device 100 or docking module 300. Acoustic sensor 520 monitors acoustic noise levels emanating from the air mover 400 and surrounding ambient area, and sends an input signal to the air mover controller 500 so that the air mover controller 500 can modulate the volume of air flow within an acceptable and predetermined temperature and tolerance of the heat generating electronic components, as well as modulate fan speed where air mover 500 is a fan.

Likewise, temperature sensor 510 monitors ambient air and sends an input signal to the air mover controller 500, so that the air mover controller 500 can modulate the volume of air flow within an acceptable and predetermined temperature tolerance of the heat generating electronic components.

Figure 6:
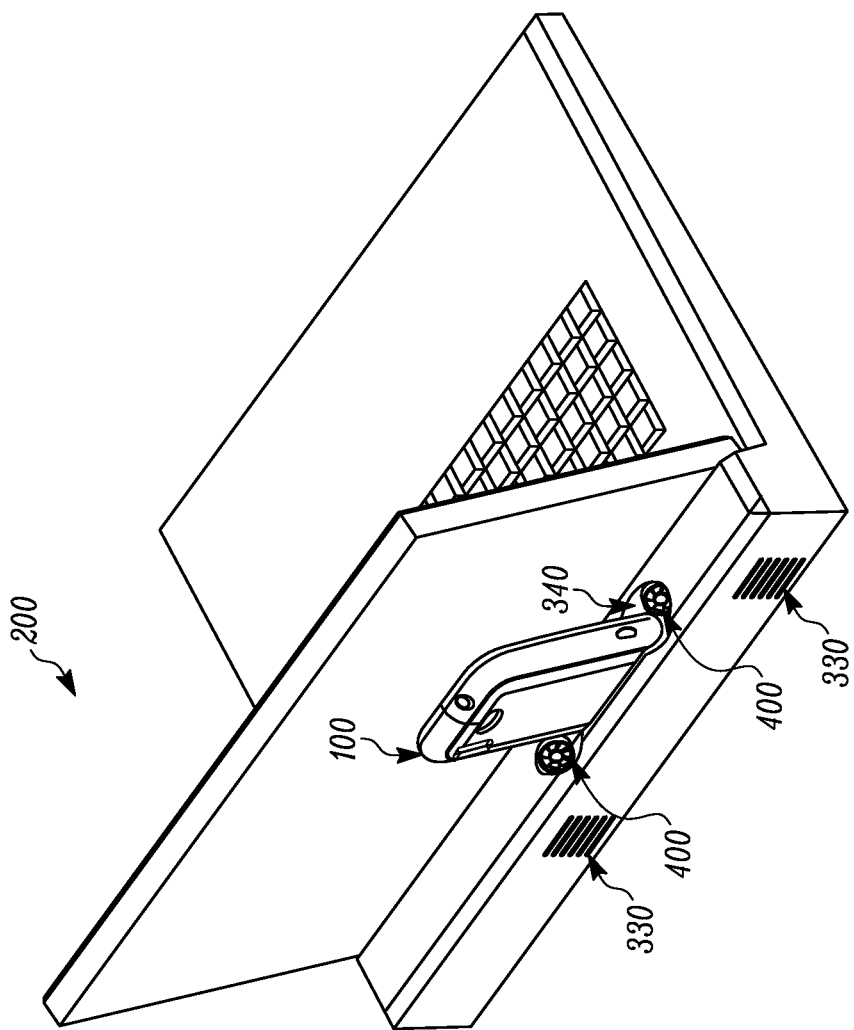
FIG. 6 is an exemplary illustration of the mobile computing device docked with the lapdock accessory.

FIG. 6 is an exemplary illustration of the mobile computing device 100 docked with the lapdock 200. For simplicity, the same numbering conventions are used for components described earlier herein. Therefore, FIG. 6 shows a mobile computing device 100 in a docked state within a dock region of lapdock 200. Lapdock 200 includes air inlets 330 for providing ambient air to the air movers 400 within dock region 340. The air movers 400 will cool the docked mobile computing device 100 while it is operating and docked to lapdock 200.

Figure 7:
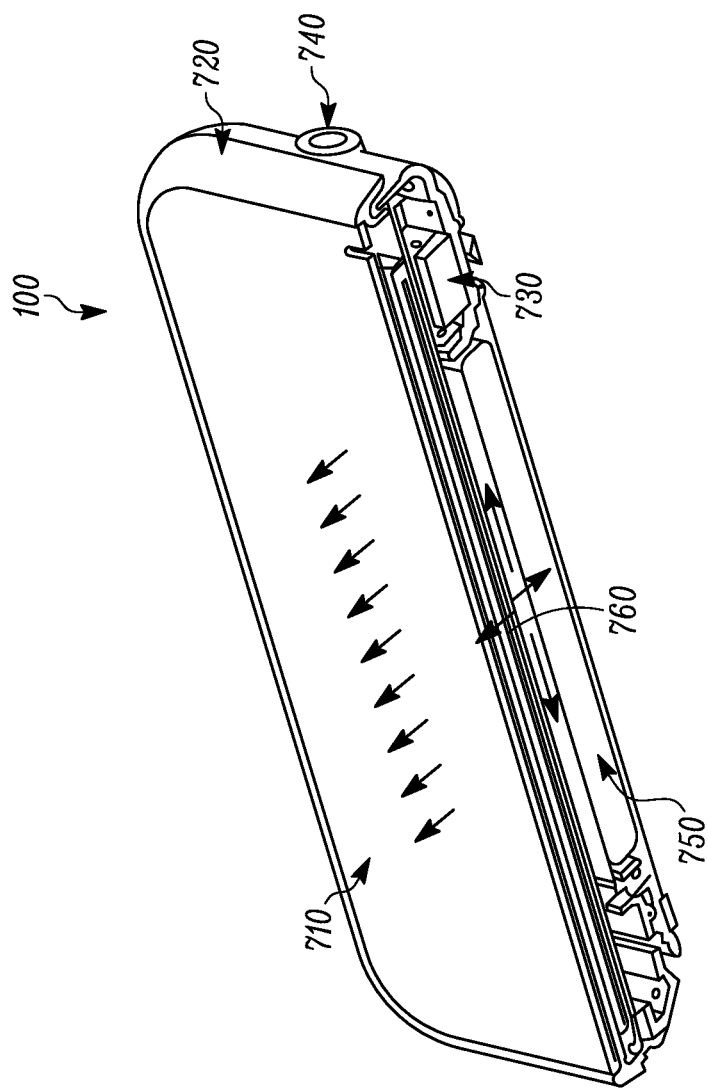
FIG. 7 is an illustration of heat dissipating from a mobile computing device.

The cooling of docked mobile computing device 100 is accomplished despite not placing an air mover 400 inside of mobile computing device 100, i.e., where the heat is actually generated from and where the heat is dissipated by the heatsink structure integrated with the mobile computing device 100. The MCD includes electronic components that are physically connected to each other using methods of bonding including soldering, bolting, and adhesives. Because all materials conduct heat, they have the tendency to absorb and transmit the heat so as to inherently form a heat sink. The MCD is designed with materials that preferentially support the transmission of the heat in an effective way so as to passively keep the MCD cool within its operating limits. FIG. 7 illustrates that heat generated from electronic components of a mobile device may be spread and dissipated to the ambient air.

Mobile computing device 100 in FIG. 7 includes a display 710 within a housing 720. Also included in mobile computing device 100 can be a camera 730, one or more jacks or electromechanical connections 740, and a battery 750 as a power source. Several electronic components 760 enable the operation of mobile computing device 100 and its corresponding applications and accessories. These electronic components generate heat during operation. The heat generated from electronic components 760 spreads internally and dissipates throughout the physical structure of mobile computing device 100, thereby forming a heatsink structure from the materials that form the mobile computing device 100. Eventually the heat is dissipated to the ambient air from the external surfaces of the mobile computing device 100.

Persons skilled in the art recognize that the total thermal resistance should be kept to a minimum value when designing a heatsink. Thus, it may make conventional sense to place the air mover 400 within the mobile computing device 100 (i.e., close to the heat source), however, it is not preferable in order to obtain aesthetic pleasing size and thickness for the mobile computing device 100.

Accordingly, the temperature differential is related to the amount of air flowing over the mobile computing device 100.

$$Q = hA(T_W - T_{amb})$$ Equation 1:

The resistance to this air flow is directly proportional to the blockages in the air path. That is if airflow is restricted by components or bends or junctions then a loss of pressure may result and the air mover will attempt to compensate by increasing static pressure and ultimately work harder. Therefore, it is not conventional or obvious to pump air flow through the internals of the mobile computing device. The air mover has to be designed to provide sufficient air flow and pressure head to cool the operating and docked mobile computing device. In addition, the air mover has to be strategically located and the air flow has to be directed over the heat dissipating surfaces (i.e., integrated heatsink) of the mobile computing device.

However, the location of the air mover can be in the dock region of the lapdock, or in keypad body of the lapdock with airflow ducted and directed towards the mobile computing device, or in the display body of the lapdock with airflow ducted and directed towards the mobile computing device, or a combination of the these alternatives.

Figure 8:
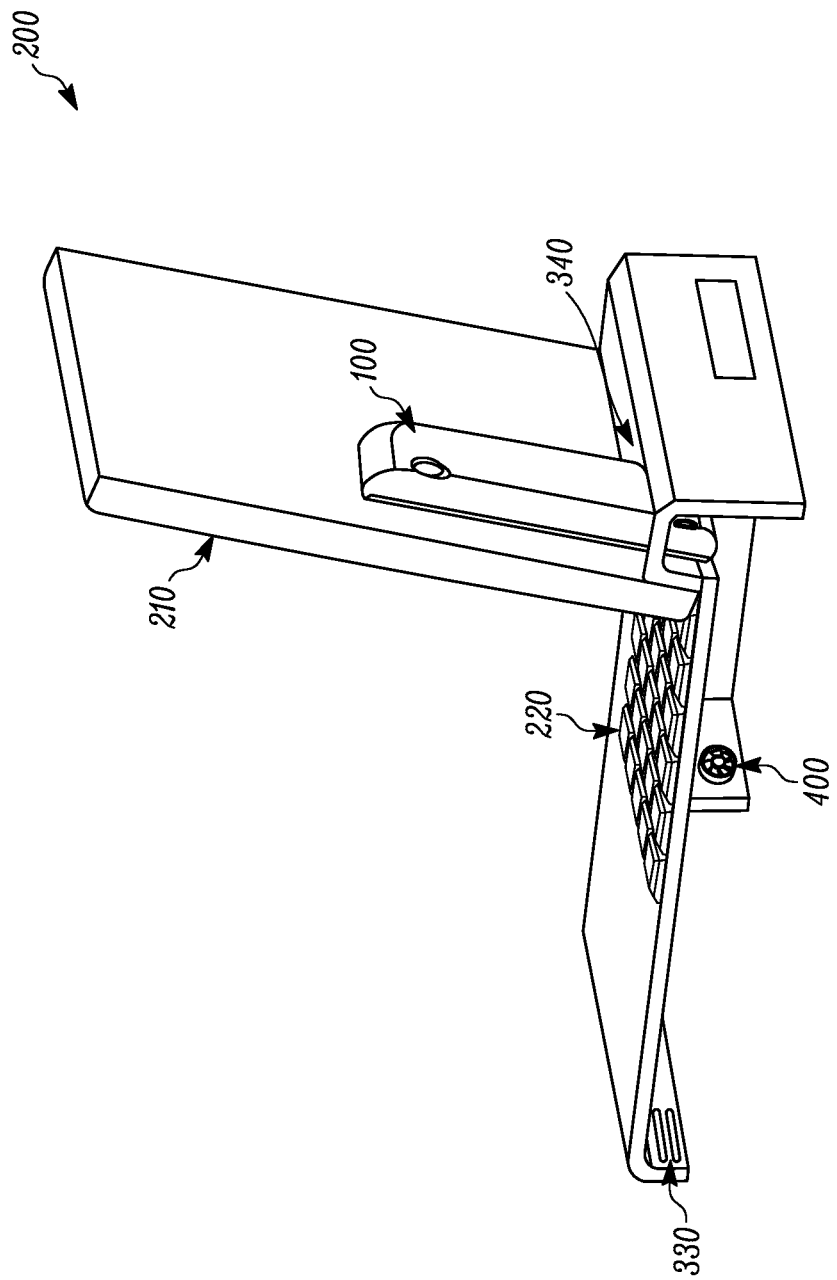
FIG. 8 is an exemplary illustration of an air mover integrated within a keypad module.

FIG. 8 illustrates an air mover integrated into a keypad of a lapdock. The component numbering is kept consistent with earlier described figures herein. Lapdock 200 includes a display 210, a keypad 220, and one or more air inlets or vents 330 in base of the keypad 220. A dock region 340 holds and electronically connects mobile computing device 100. Air mover 400 is located below keypad 220 and directs a volume of air flow to the docked mobile computing device 100 when an air controller (not shown) sends a modulating signal.

Figure 9:
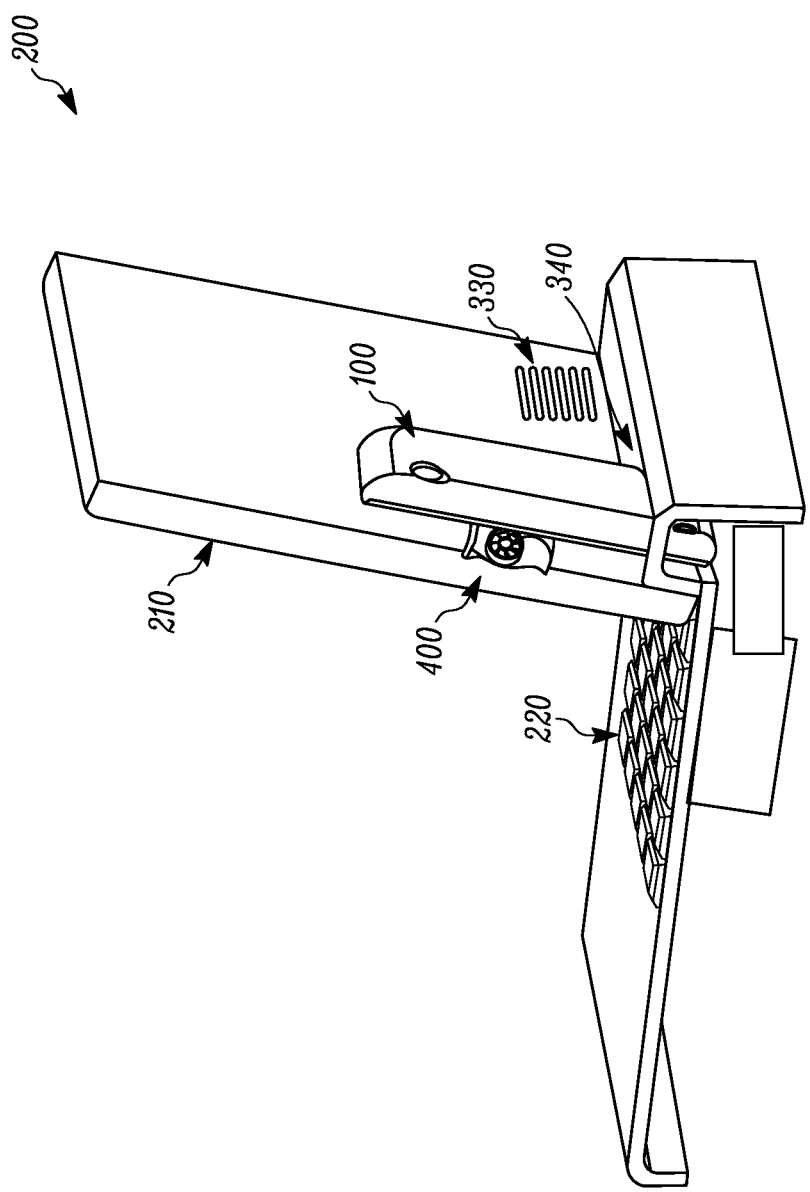
FIG. 9 is an exemplary illustration of an air mover integrated within a display module.

FIG. 9 illustrates an air mover integrated into a display of a lapdock. The component numbering is kept consistent with earlier described figures herein. Lapdock 200 includes a display 210, a keypad 220, and one or more air inlets or vents 330 in rear of the display 210. A dock region 340 holds and electronically connects mobile computing device 100. Air mover 400 is located within housing of display 210 and proximate to dock 340 for directing a volume of air flow to the docked mobile computing device 100 when an air controller (not shown) sends a modulating signal.

Active cooling techniques as equivalent air movers can include blowers, piezos, or vane-axial to augment air flow. Possible fans or blowers can be speed controlled for power and acoustic noise mitigation. Acoustic sensor can provide input to the controller for activating the air mover or fan only when needed. Acoustic sensing can be accomplished by microphones placed either on the mobile computing device or the lapdock. Necessary noise suppression or cancellation can be provided by speakers on the mobile computing device or lapdock.

Several air movers can be located in either one region or as a combination of several regions, (i.e., dock, keypad and display) to allow for flexibility of fitting within the aesthetic and technical specification regarding thickness of the lapdock; to provide higher air flow rates towards the mobile computing device; and to reduce acoustic noise during critical application usage.

Similarly, various temperature sensors can aid in air mover control, for example, thermocouples, thermistor, or an infrared sensor. Finally, the lapdock can be wirelessly connected to the mobile computing device, while bowing air over the mobile computing device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An apparatus for connection with a separable mobile computing device, comprising:
   a docking module including a docking interface providing a communication connection with the separable mobile computing device docked in the docking module, wherein the separable mobile computing device comprises a plurality of heat generating electronic components that emanate heat when the separable mobile computing device is operating;
   a display housing extending outwardly from the docking module, the display housing including a dock display and a heat sink structure for the separable mobile computing device, the heat sink structure to spread the heat emanating from the heat generating electronic components across the dock display, the separable mobile computing device positioned against the display housing when connected to the docking interface;
   an air mover carried on the display housing and a vent carried on the display housing, the air mover and vent located on the display housing on opposite sides of the separable mobile computing device while the separable mobile computing device is connected to the docking interface to provide a volume of air flow across the display near the separable mobile computing device connected to the docking interface; and an air mover controller that receives a first signal from a temperature sensor and controls the air mover to modulate the volume of air flow according to a predetermined temperature tolerance of the heat generating electronic components.

2. The apparatus according to claim 1, wherein the temperature sensor resides within the separable mobile computing device.

3. The apparatus according to claim 1, wherein the temperature sensor resides within the docking module.

4. The apparatus according to claim 1, further comprising an acoustic sensor that monitors acoustic noise levels and sends a second signal to the air mover controller such that the air mover controller further modulates the volume of air flow within the predetermined temperature and acoustic noise tolerance of the heat generating electronic components.

5. The apparatus according to claim 4, wherein the acoustic sensor resides within the separable mobile computing device.

6. The apparatus according to claim 4, wherein the acoustic sensor resides within the docking module.

7. The apparatus according to claim 1, wherein the docking interface includes a wireless interface for communicating to the docking module when the separable mobile computing device is not physically connected to the docking module.

8. An air mover located within a docked region of a docking module, wherein the air mover is controlled by an air mover controller that is receptive to one or more sensor signals.

9. The air mover according to claim 8, wherein the one or more sensor signals include a temperature sensor signal and an acoustic sensor signal.

10. The air mover according to claim 9, wherein the air mover controller modulates air flow, generated by the air mover, within a predetermined temperature and acoustic noise tolerance for a mobile computing device docked and operating within the docked module.

11. A dock for a separable mobile computing device, comprising a docking module having a docking module including a docking interface providing a communication connection with the separable mobile computing device; a dock display housing extending outwardly from the docking module, the separable mobile computing device positioned against the display housing when the separable mobile computing device is connected to the docking interface, the dock display housing including a dock display, and the dock display housing carrying an air mover and a vent, the air mover and vent located on the display housing on opposite sides of the separable mobile computing device connected to the docking interface for passing air across the dock display near the separable mobile computing device while the mobile computing device is docked in the docking interface, and the docking display providing a display for the mobile computing device while the mobile computing device is connected to the docking interface.

12. The lapdock according to claim 11, wherein air directed by the air mover is modulated by an air mover controller having temperature and acoustic sensor input signals.

13. The lapdock according to claim 12, wherein the air mover controller modulates a volume of air flow within predetermined temperature and acoustic noise tolerance of heat generating electronic components within the mobile computing device.

* * * * *